United States Patent
Wang et al.

(10) Patent No.: US 11,616,548 B2
(45) Date of Patent: Mar. 28, 2023

(54) MILLIMETER-WAVE BEAM ALIGNMENT ASSISTED BY ULTRA WIDE BAND (UWB) RADIO

(71) Applicant: SAMSUNG ELECTRONICS CO., LTD., Suwon-si (KR)

(72) Inventors: Ju Wang, Montreal (CA); Xi Chen, Montreal (CA); Xue Liu, Montreal (CA); Gregory Lewis Dudek, Westmount (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 3 days.

(21) Appl. No.: 17/410,091

(22) Filed: Aug. 24, 2021

(65) Prior Publication Data

US 2022/0116088 A1    Apr. 14, 2022

Related U.S. Application Data

(60) Provisional application No. 63/090,527, filed on Oct. 12, 2020.

(51) Int. Cl.
*H04B 7/06* (2006.01)
*H04B 17/318* (2015.01)

(52) U.S. Cl.
CPC ......... *H04B 7/0617* (2013.01); *H04B 17/318* (2015.01)

(58) Field of Classification Search
CPC .. H04B 7/0617; H04B 17/318; H04B 17/102; H04B 7/086; H04W 52/267
USPC ....................................................... 375/130
See application file for complete search history.

(56) References Cited

U.S. PATENT DOCUMENTS

| | | | |
|---|---|---|---|
| 8,965,282 B2* | 2/2015 | Barbotin | H04B 1/719 375/130 |
| 10,408,930 B2 | 9/2019 | Karls et al. | |
| 10,461,421 B1* | 10/2019 | Tran | H01Q 19/09 |
| 2009/0213901 A1 | 8/2009 | Berens | |
| 2019/0069294 A1 | 2/2019 | Va et al. | |
| 2020/0049790 A1 | 2/2020 | Hollar | |
| 2020/0088869 A1 | 3/2020 | Pefkianakis et al. | |
| 2020/0382265 A1 | 12/2020 | Fukui | |

FOREIGN PATENT DOCUMENTS

CN    111650575 A    9/2020

OTHER PUBLICATIONS

Communication dated Jan. 7, 2022 issued by the International Searching Authority in counterpart Application No. PCT/KR2021/013890 (PCT/ISA/220, PCT/ISA/210, and PCT/ISA/237).

Ju Wang et al., "Eliminating Millimeter-Wave Beam Alignment Cost With UWB", Oct. 10, 2020, 7 pages total.

* cited by examiner

*Primary Examiner* — Fitwi Y Hailegiorgis
(74) *Attorney, Agent, or Firm* — Sughrue Mion, PLLC

(57) ABSTRACT

A first device and second device communicate using mmWave communication with antenna alignment based on processing of ultra wide band (UWB) pulses. A limit on angle resolution due to a small number of antennas on either of the devices is relieved by using two or more carrier frequencies in the UWB pulses. A limit on angle resolution is further overcome in some situations by use of a neural network to refine angle estimates. In some situations, received power values are further used to select an angle for beam alignment.

20 Claims, 13 Drawing Sheets

MILLIMETER-WAVE BEAM ALIGNMENT ASSISTED BY ULTRA WIDE BAND (UWB) RADIO

CROSS REFERENCE TO RELATED APPLICATION

This application claims benefit of priority of U.S. Provisional Application No. 63/090,527 filed Oct. 12, 2020, the contents of which are hereby incorporated by reference.

FIELD

The present disclosure is related to alignment of a transmit antenna beam in a millimeter wave (mmWave) band using ultra wide band (UWB) signals.

BACKGROUND

A frequency band of mmWave communication occurs in a range of frequencies extending from 28 GHz to 100 GHz ("mmWave band"). In this frequency band, there are low delay spreads from multipath components created by reflectors within a single room.

SUMMARY

A problem exists with communication in the mmWave band because multipath components may be strongly attenuated. Communication using a direct path overcomes this problem (if the path is not blocked). However, beam alignment is difficult with a small number of antennas at a User Equipment device (UE) because a beam of an antenna array with a small number of antennas is wide.

In embodiments, mmWave communication is performed using antenna beams that are aligned using signals at two or more ultra wide-band (UWB) frequencies. Embodiments provide a technique for mmWave beam alignment of the UE using a UWB radio in the UE. An example UWB radio transmits pulses with a bandwidth of 500 MHz at carrier frequencies in a range from 3.5 GHz to 10 GHz. Embodiments perform the alignment using two or more UWB carrier frequencies in order to overcome a limitation of a small number of antennas at the UE.

Provided herein is a method of aligning mmWave beam transmissions, the method including: receiving, at a second antenna array of a second device, a first plurality of ultra wideband (UWB) pulses from a first antenna element of a first device, wherein the first plurality of UWB pulses has a first carrier frequency, and a first antenna array of the first device includes the first antenna element; receiving, at the second antenna array of the second device, a second plurality of UWB pulses from the first antenna element, wherein the second plurality of UWB pulses has a second carrier frequency; computing, based on the first plurality of UWB pulses and the second plurality of UWB pulses, an angle of arrival (AoA) spectrum at the second device; and aligning a mmWave beam at the second device based on the AoA spectrum.

Also provided herein is a device including: an antenna array; one or more memories; and one or more processors, wherein the one or more processors are configured to access a computer program stored as plurality of instructions stored in the one or more memories, wherein the computer program is configured to cause the one or more processors to: receive, at the antenna array, a first plurality of ultra wideband (UWB) pulses from a first antenna element of another device, wherein the first plurality of UWB pulses has a first carrier frequency, and another antenna array of the another device includes the first antenna element of the another device; receive, at the antenna array, a second plurality of UWB pulses from the first antenna element of the another device, wherein the second plurality of UWB pulses has a second carrier frequency; compute, based on the first plurality of UWB pulses and the second plurality of UWB pulses, an angle of arrival (AoA) spectrum at the device; and align a mmWave beam at the device based on the AoA spectrum.

Also provided herein is a non-transitory computer readable medium storing a computer program, wherein the computer program is configured to cause a device to: receive, at an antenna array, a first plurality of ultra wideband (UWB) pulses from a first antenna element of another device, wherein the first plurality of UWB pulses has a first carrier frequency, and another antenna array of the another device includes the first antenna element of the another device; receive, at the antenna array, a second plurality of UWB pulses from the first antenna element of the another device, wherein the second plurality of UWB pulses has a second carrier frequency; compute, based on the first plurality of UWB pulses and the second plurality of UWB pulses, an angle of arrival (AoA) spectrum at the device; and align a mmWave beam at the device based on the AoA spectrum.

Provided herein is another method of aligning mmWave beam transmissions, the another method including: receiving, at a second antenna array of a second device, a first plurality of ultra wideband (UWB) pulses from a first antenna element of a first device, wherein the first plurality of UWB pulses has a first carrier frequency, and a first antenna array of the first device includes the first antenna element; receiving, at the second antenna array of the second device, a second plurality of UWB pulses from the first antenna element, wherein the second plurality of UWB pulses has a second carrier frequency; computing, based on the first plurality of UWB pulses and the second plurality of UWB pulses, an angle of arrival (AoA) spectrum at the second device, wherein the AoA spectrum has a plurality of intensity values at a corresponding first plurality of angle values; calculating a confidence value based on the AoA spectrum; when the confidence value is higher than a threshold: aligning a mmWave beam at the second device based on the AoA spectrum; when the confidence value is not higher than the threshold: converting the AoA spectrum to a two dimensional image; estimating, using a convolutional neural network applied to the two dimensional image, a second plurality of fine grained angle values; and aligning the mmWave beam at the second device based on the second plurality of fine grained angle values.

BRIEF DESCRIPTION OF THE DRAWINGS

The text and figures are provided solely as examples to aid the reader in understanding the invention. They are not intended and are not to be construed as limiting the scope of this invention in any manner. Although certain embodiments and examples have been provided, it will be apparent to those skilled in the art based on the disclosures herein that changes in the embodiments and examples shown may be made without departing from the scope of embodiments provided herein.

DETAILED DESCRIPTION

Figure 1A:
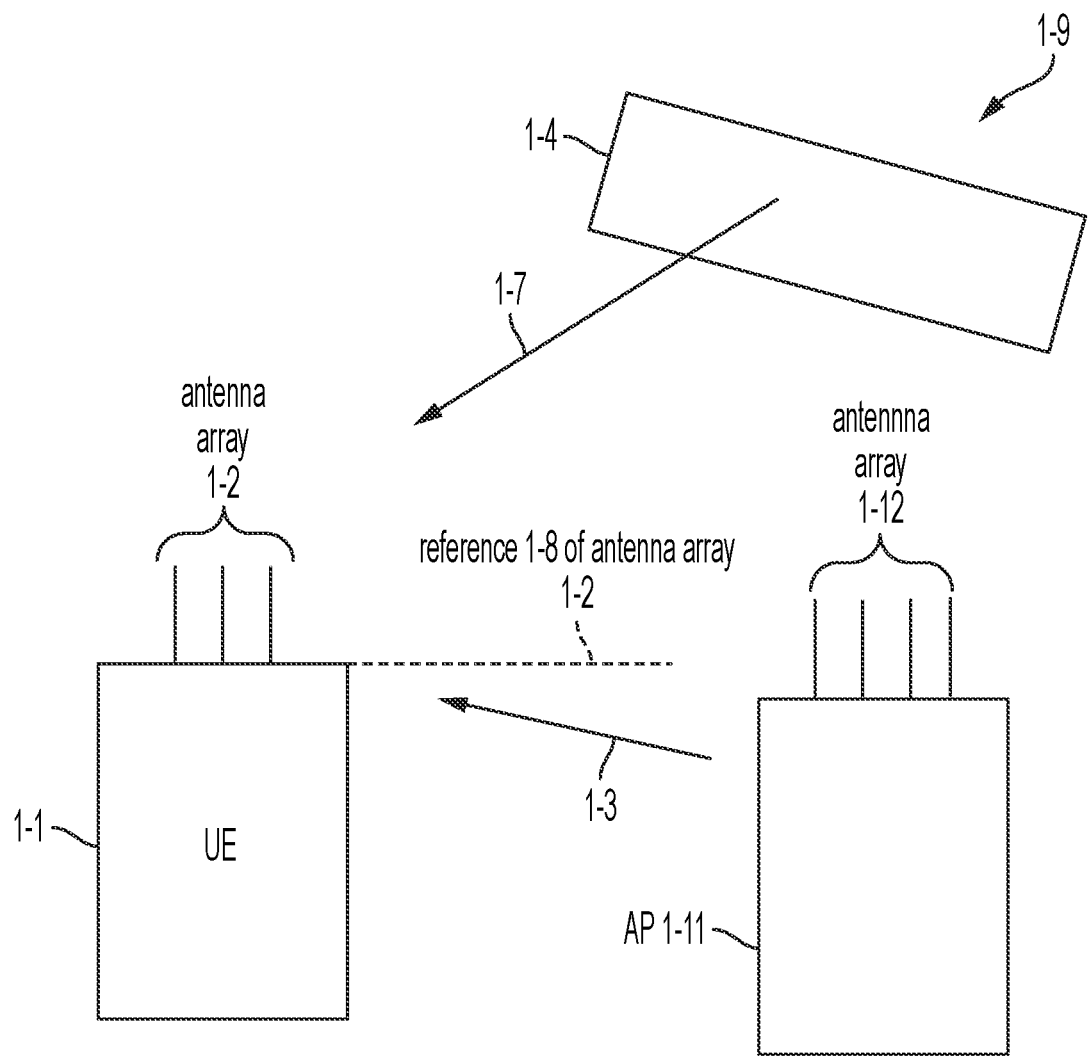
FIG. 1A illustrates signal arriving at a UE 1-1 from an access point (AP 1-11), according to some embodiments.
Figure 1A:
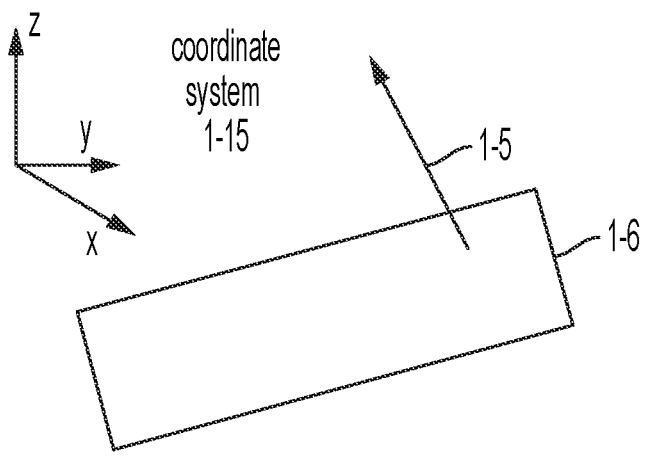

FIG. 1A illustrates a scenario 1-9 in which an access point (AP) 1-11 transmits a signal 1-3 to a UE 1-1. Scatterers 1-4 and 1-6 cause reflected signals 1-7 and 1-6 to also reach the UE 1-1. The scatterers may be for example, walls and/or furniture. The arrival of the signal 1-3 directly without reflection is referred to as a line of sight path (LOS). The other paths may be called non-LOS (NLOS).

UE 1-1 includes antenna array 1-2 and AP 1-11 includes antenna array 1-12.

An x, y, z, coordinate system 1-15 is indicated in FIG. 1A. Also, a reference 1-8 of antenna array 1-2 is indicated as a dashed line.

Figure 1B:
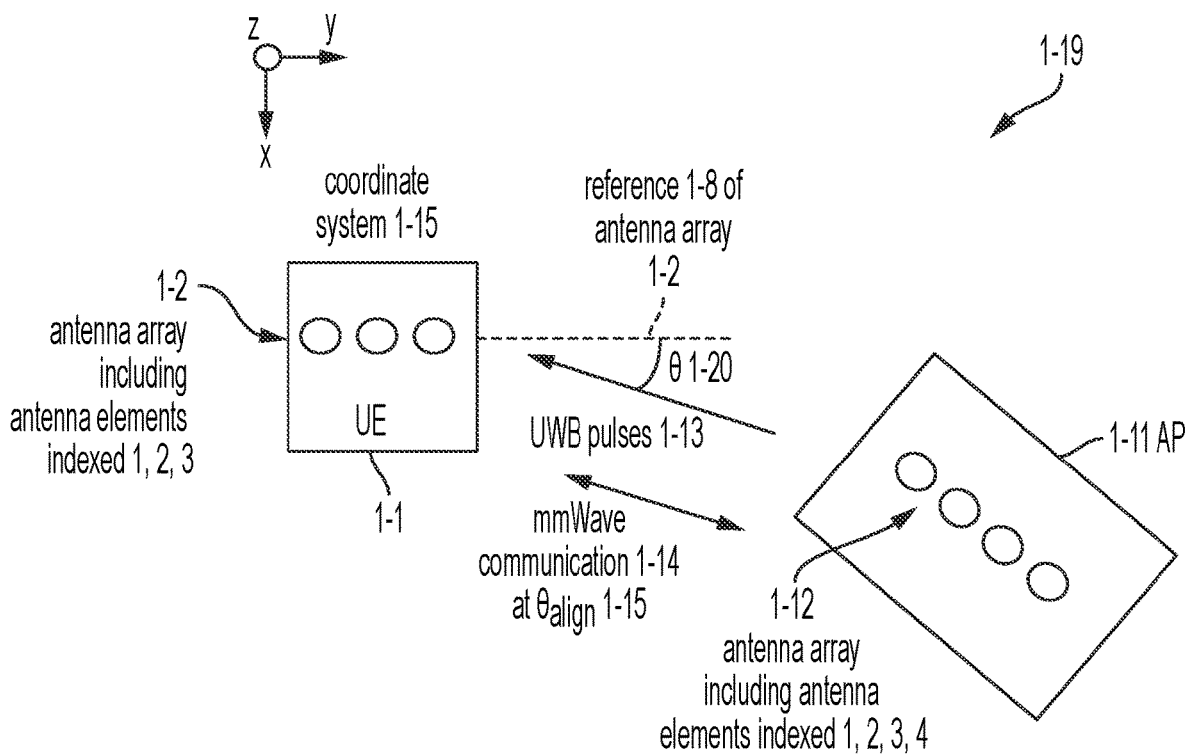
FIG. 1B illustrates an antenna array 1-2 of the UE 1-1 and the antenna array 1-2 of the AP 1-11, according to some embodiments.
Figure 1C:
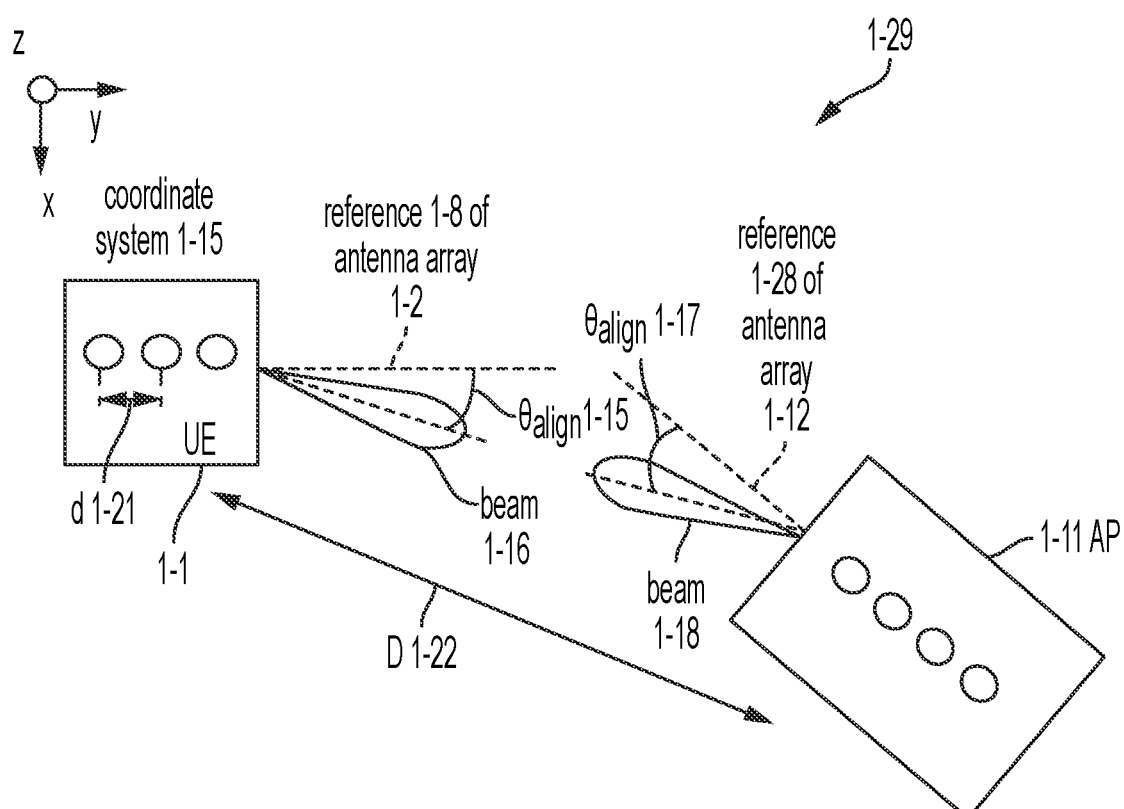
FIG. 1C illustrates an antenna array 1-2 of the UE 1-1 and the antenna array 1-2 of the AP 1-11 with alignment angles and with beams, according to some embodiments.

Generally, the signal 1-3 is the form of a narrow beam, see example beam 1-18 in FIG. 1C. For mmWave communication, the highest data rates are generally obtained if the UE beam associated with antenna array 1-2, beam 1-16, is aligned with the AP beam associated with antenna array 1-12, beam 1-18. The angle and $\theta_{align}$ 1-17 is indicated with respect to a reference 1-28 of the antenna array 1-12. The alignment angles are denoted $\theta_{align}$ 1-15 and $\theta_{align}$ 1-17 at the UE 1-1 and AP 1-11, respectively.

FIG. 1B illustrates the UE 1-1 and the AP 1-11 as a system 1-19 (scatterers, not shown, are generally also present). FIG. 1B is in plan view, looking down at z-axis of coordinate system 1-15. The number of antenna elements in each antenna array is not limited to the number of elements shown in FIG. 1B. FIG. 1B is an example.

An azimuth angle, θ 1-20, is indicated in FIG. 1B. The angle is not limited to azimuth; azimuth is shown for illustration.

FIG. 1C illustrates geometry of beam alignment. Antenna elements are spaced by a distance d 1-21. The spacing may be different at the UE 1-1 and the AP 1-11. A single value is used here for clarity of explanation. The UE 1-1 and the AP 1-11 are separated by a distance D 1-22.

In comparative approaches to the problem of beam alignment, AP 1-11 would sweep the beam 1-18 from antenna array 1-12 and UE 1-1 would record observations. The sweeping by the AP 1-11 would be done by controlling the phase of signals provided to each of antenna elements 4, 5, 6, 7 (see FIG. 1B). UE 1-1 would then sweep the beam 1-16 from antenna array 1-2 and the AP 1-11 would record observations. The sweeping by the UE 1-1 would be done by controlling the phase of signals provided to each of antenna elements 1, 2, 3 (see FIG. 1B). Each device would then configure their antenna array for the corresponding observed maximum received power and the solution is denoted as the pair ($\theta_{align}$ 1-15, $\theta_{align}$ 1-17). This is time consuming.

Embodiments use UWB pulses 1-13 at two or more carrier frequencies in order to find good values for the pair ($\theta_{align}$ 1-15, $\theta_{align}$ 1-17), that is, achieve beam alignment.

Referring again to FIG. 1B, in some embodiments, AP 1-11 uses a UWB transceiver 8-11 to transmit UWB pulses from one of the antenna elements (choosing index 1, 2, 3, or 4; the index may default to 1) as a first group of pulses. UE 1-1 receives the transmitted pulses and stores observed intensity and phase values (for example, voltage in complex form or equivalently I and Q form). The stored values may be represented in a vector.

AP 1-11 then repeats the transmission of UWB pulses from the same antenna element but with a different carrier frequency. The difference between one carrier frequency and the next may be, for example, about 500 MHz. UE 1-1 receives the second group of transmitted pulses and stores observed intensity and phase values. The vector may be extended to include the second group.

A correlation matrix representing a second moment of the vector may then be formed. Next, a noise subspace of the correlation matrix may be determined. Finally, an angle of arrival spectrum may be obtained based on an inverse of a quadratic form with the kernel of the quadratic form based on the noise subspace. Before describing the full details of embodiments, some preliminary expressions are developed.

Math Preliminaries

A phase difference between an $m^{th}$ antenna element and a reference antenna element is given in Eq. 1.

$$\omega(m, \theta_p) = \left(2\frac{\pi}{\lambda}\right)(m-1)d\cos(\theta_p) \quad \text{Eq. 1}$$

where the antenna elements are spaced by distance d 1-21, λ is the wavelength of the carrier wave impinging on the array, m is the index of an antenna in an array of M antennas and p is the index of the arriving carrier wave (there may be L such waves, with L>1 if scattering exists).

The received signal at the $m^{th}$ antenna is given in Eq. 2.

$$x_m = \Sigma s_p e^{-j\omega(m,\theta_p)} \quad \text{Eq. 2}$$

where the summation is over the index p from 1 to L, and s is a complex pulse shape, attenuated for the $p^{th}$ path, possibly with data modulation. The function ω(•,•) is defined in Eq. 1.

There are M elements in the antenna array being considered as receiving a signal. The received signal vector X at one moment in time sampled over the M antennas is given in Eq. 3.

$$X = AS + n \quad \text{Eq. 3}$$

Where n is a noise vector, A is a steering matrix with columns $a(\theta_p)$ given in Eq. 4.

$$a(\theta_p)=[1, e^{-j\omega(2,\theta_p)}, \ldots, e^{-j\omega(M,\theta_p)}]^T \quad \text{Eq. 4}$$

where $(\cdot)^T$ denotes transpose.

An algorithm known as MUSIC estimates angles of arrival (AOAs) by analyzing the eigenstructure of the correlation matrix $R = \mathbb{E}[XX^H]$ of the received vector X, where $(\cdot)^H$ denotes Hermetian transpose. The correlation matrix R has M eigenvalues. The largest L (L<M) eigenvalues correspond to L incoming signals while the rest, M–L eigenvalues, correspond to noise.

The eigenvectors corresponding to the M–L eigenvalues form the basis of a noise vector subspace $U_N$. Due to the orthogonality between the steering vector and the noise subspace, $a(\theta_p)^H U_N$ is close to zero. The AoA spectrum of MUSIC is given in Eq. 5.

$$P(\theta_p) = \frac{1}{a^H(\theta_p) U_N U_N^H a(\theta_p)} \quad \text{Eq. 5}$$

Solution, Multiple Frequencies

As shown above, AoA can be estimated because different phase differences at elements of an antenna array depend on angle of arrival (AoA). Embodiments use the fact that phase difference values at different frequencies also depend on angle of arrival (AoA). Embodiments use phase differences of multiple frequencies to improve AoA estimation accuracy with a limited number of antennas.

Embodiments extend the MUSIC algorithm to multiple carrier frequencies. Suppose that there are K frequency bands in UWB and their center frequencies are $\{f_1, \ldots f_k, \ldots, f_K\}$. The AP 1-11 transmits two signals with frequencies of $f_1$ and $f_k$. Then, the two signals will arrive at antenna array 1-2 with the same AoA $\theta_p$. The signal phase difference $\phi(m, f_k)$ of the two frequencies measured at the $m^{th}$ antenna is given in Eq. 6.

$$\phi(m, f_k) = 2\pi(f_k - f_1) \frac{D - (m-1)d\cos(\theta_p)}{c} \quad \text{Eq. 6}$$

where c is the speed of light, d 1-21 is the inter-element spacing and D 1-22 is the distance between the transmitter and the first antenna. D 1-22 can be measured by UWB radios accurately.

For a given geometry of UE 1-1, AP 1-11, the antenna array 1-2, $f_k$, $f_1$, D 1-22, and d 1-21 are constants. Then, the phase difference in Eq. 6 can be simplified as shown in Eq. 7.

$$\phi(m) = C_1 \sim \cos(\theta_p) + C_2 \quad \text{Eq. 7}$$

where $C_1$ and $C_2$ are two constants related to $f_k$, $f_1$, D 1-22, and d 1-21. Eq. 7 implies that, if the phase difference of the $m^{th}$ antenna in the given two frequencies is known, then the AoA $\theta_p$ ($\theta$ 1-20 in FIG. 1B) can be determined. Being able to determine $\theta_p$ for the $p^{th}$ path based on $\phi$ means multiple frequencies can be used for AoA estimation.

Using multiple frequencies in the frequency domain can increase the accuracy and resolution of AoA estimation. Comparative AoA estimation methods (e.g., MUSIC) use only a single frequency and multiple antennas in the spatial domain.

An example of measureable phase differences is provided here based on Eq. 1 and Eq. 6. In the example, for AoAs of 0-180 degrees, a measurable range of phase differences using two frequencies in the frequency domain is increased by 5:83/3:14=1.86, compared with the phase difference measured at two antennas in the spatial domain. In this example, Eq. 1 of spatial domain has been compared with Eq. 6 of frequency domain for example parameter values of $f_1$=3494.4 MHz, $f_k$=9984.0 MHz, and M=2 (i.e., two antennas). Overall, the phase differences vary by different AoAs, which is important for AoA estimation. Also, the example demonstrates that using multiple frequencies can improve the accuracy of AoA estimation.

Generalizing these ideas, consider an antenna array with M antennas. Each antenna can work with K frequency bands. Then, embodiments form a virtual array composed of M x K virtual antennas. Consider the first frequency (i.e., $f_1$) as the reference frequency and the first antenna as the reference antenna. Let $s_{p,f_k}$ be an incoming signal with AoA $\theta_p$ and frequency $f_k$, where, p=1; 2; ..., L and k=1; 2; ..., K. Then, based on Eq. 2, the received signal $x_{m,f_k}$ at the $m^{th}$ antenna with frequency $f_k$ is expressed as in Eq. 8.

$$x_{m,f_k} = \Sigma s_{p,f_k} \cdot e^{-j\omega(m,\theta_p)} \quad \text{Eq. 8}$$

$$= \Sigma s_{p,f_k} \cdot e^{-j\omega(m,\theta_p - \phi(m,f_k))}$$

The summation in Eq. 8 is over the index p ranging from 1 to L.

The received signal vector X' at the antenna area is given in Eq. 9.

$$X' = \left[\overline{x_{1,f_1}, \ldots x_{1,f_K}}^{\text{Antenna 1}}, \overline{x_{2,f_1}, \ldots x_{2,f_K}}^{\text{Antenna 2}}, \ldots, \overline{x_{M,f_1}, \ldots x_{M,f_K}}^{\text{Antenna M}}\right]^T \quad \text{Eq. 9}$$

The steering vector, similar to Eq. 4, is given as $$a'(\theta_p) = y^T \text{ and } y = [\overline{1, 1, \ldots, 1}^{\text{Antenna 1}},$$

$$\overline{\exp(-j[\omega(2, \theta_p) - \phi(2, f_1)]), \ldots, \exp(-j[\omega(2, \theta_p) - \phi(2, f_K)])}^{\text{Antenna 2}}, \ldots,$$

$$\overline{\exp(-j[\omega(M, \theta_p) - \phi(M, f_1)]), \ldots, \exp(-j[\omega(M, \theta_p) - \phi(M, f_K)])}^{\text{Antenna M}}]$$

Applying the same steps as used to progress to Eq. 5, Eq. 9 can be used to find a noise subspace $U_N'$ based on a correlation matrix R', where $R' = \mathbb{E}[X'(X')^H]$. The AoA spectrum $P'(\theta_p)$ is given in Eq. 10.

$$P'(\theta_p) = \frac{1}{[a'(\theta_p)]^H U_N' (U_N')^H a'(\theta_p)} \quad \text{Eq. 10}$$

P'($\theta$) shows peaks at AoAs of incoming signals. Well-separated angles show sharper peaks.

Varying the free variable of the quadratic form over candidate angles of arrival (AoA or $\theta$) provides values of the AoA power spectrum, P'($\theta$). In some embodiments, the UE 1-1 may then configure phase values of a steering vector applied to the elements of the antenna array 1-2 so that the antenna array 1-2 forms a beam 1-16 in a direction $\theta_{align}$ 1-15. $\theta_{align}$ 1-15, in some embodiments, is given as $$\theta_{align} = \underset{\theta}{\arg\max} \, P'(\theta).$$

Figure 2:
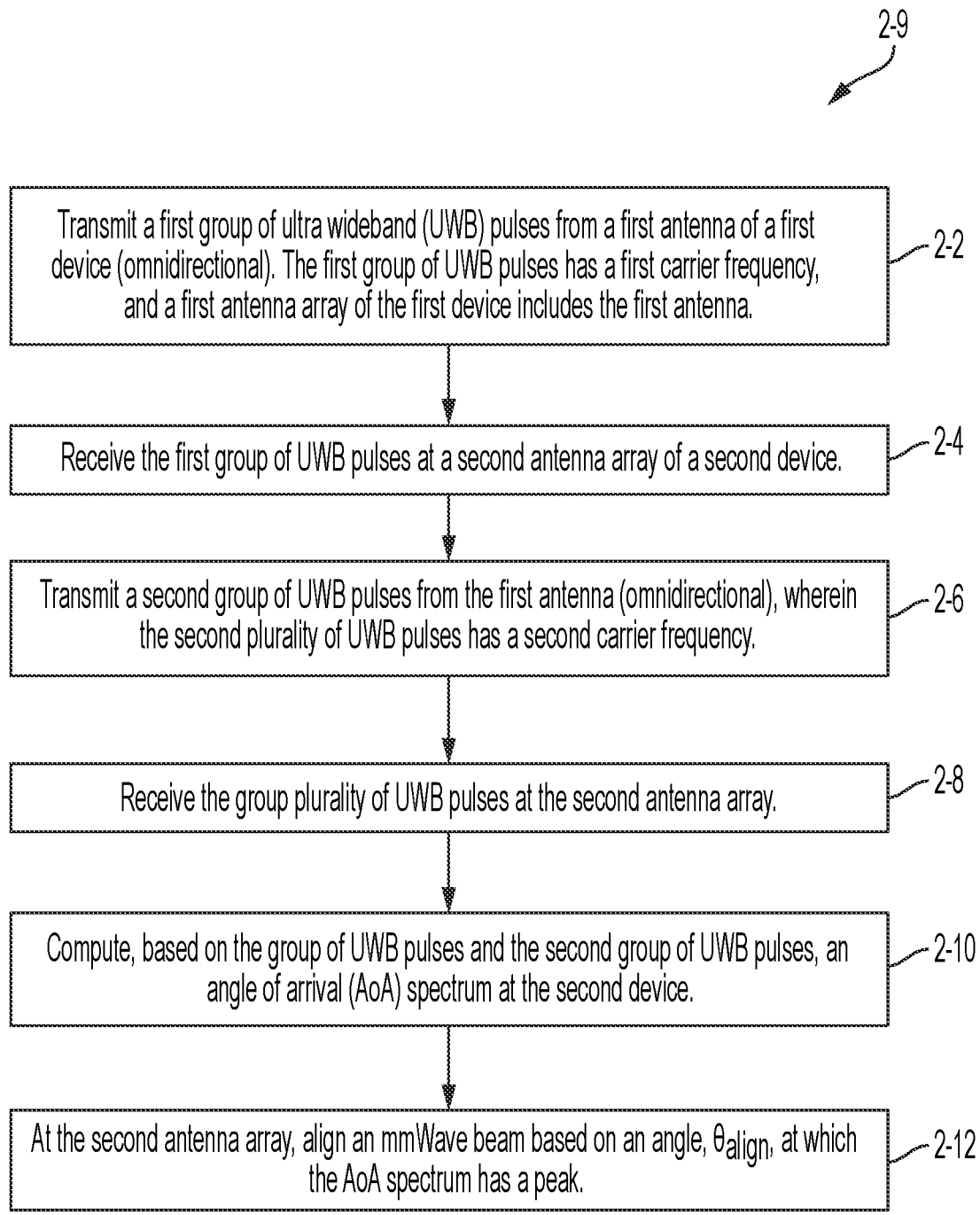
FIG. 2 illustrates logic of aligning an mmWave beam, according to some embodiments.

FIG. 2 illustrates exemplary logic 2-9 for aligning an mmWave beam.

Operation 2-2 includes transmitting a first group of UWB pulses from a first antenna of a first device (omnidirectional). The first group of UWB pulses has a first carrier frequency. For example, this first antenna could be any of the antenna elements 1-4 of antenna array 1-12 of AP 1-11 shown in FIG. 1B. Operation 2-4 includes receiving the first group of UWB pulses at a second antenna array of a second device. Operation 2-6 includes transmitting a second group of UWB pulses from the first antenna (omnidirectional), wherein the second plurality of UWB pulses has a second carrier frequency. Operation 2-8 includes receiving the group plurality of UWB pulses at the second antenna array. Operation 2-10 includes computing, based on the first group of UWB pulses and the second group of UWB pulses, an angle of arrival (AoA) spectrum at the second device. Operation 2-12 includes aligning, at the second antenna array, an mmWave beam based on an angle, $\theta_{align}$, at which the AoA spectrum has a peak.

When there are multiple arriving waves, such as signals 1-3, 1-5 and 1-7 of FIG. 1A, it is useful to know which signal to align the beam with. The direct path is preferred, and can be identified using time of flight. Time of flight can be provided by the UWB transceiver 8-11.

However, due to possible penetration loss due to the direct path passing through an attenuating object, an indirect path may be better. Embodiments provide an algorithm for determining which path to align the beam with.

Specifically, when the direct path is clear, the direct path angles are the best alignment angles, since it has the minimum energy attenuation than other paths. When the direct path is blocked, mmWave radios have to find a reflection path for communications. To identify if the direct path is blocked or not, a method compares the received UWB signal power against a pre-obtained baseline signal power when the direct path is clear, since a blockage, if present, will decrease the signal power significantly. Embodiments use a UWB estimated distance and propagation models to estimate the baseline signal power. As an example, when the direct path is clear, the received signal power $P_{rx}$ equals to the transmitted power $P_{tx}$ minus the attenuation loss $\Delta R$ over a propagation distance D as shown in Eq. 11.

$$P_{rx} = P_{tx} - \Delta R = P_{tx} 10\gamma \log D \qquad \text{Eq. 11}$$

where $\gamma$ is the rate of signal power attenuation and is related to the environment.

Existing UWB technology can estimate D accurately with mm-level accuracy and $P_{tx}$ is available at the transmitter side. Thus, Eq. 11 implies that the estimation accuracy of baseline signal power depends on $\gamma$ which varies over different environments. For a given environment ($\gamma$), embodiments calculate the baseline signal power $P^B_{rx}$ of the direct path using Eq. 11, and measure the direct path signal power $P^M_{rx}$. If $|P^B_{rx} - P^M_{rx}|$ is smaller than a threshold Th (Th=3 dB, for example), embodiments identify the direct path as clear; otherwise, the direct path is blocked. The beam alignment angle selection method is summarized in Table 1 below.

TABLE 1

Beam Alignment Selection Algorithm

| | Algorithm |
|---|---|
| Input | (i) Possible communication angles $\theta_p$ and their received signal power, where $\theta_1$ is the direct path angle. (ii) The estimated distance D 1-22 between transceivers, and the environment propagation constant $\gamma$. (iii) The transmission power $P_{tx}$ and the direct path received power $P_{rx}^M$. |
| Output | The selected beam alignment angle, $\theta_{align}$. |
| 1 | $P_{rx}^B = P_{tx} - 10\gamma \log D$ |
| 2 | if $|P_{rx}^B - P_{rx}^M| \leq$ Th then |
| 3 | $\theta_{align} = \theta_1$ |
| 4 | else |
| 5 | $\theta_{align} = \underset{\theta}{\operatorname{argmax}}\{\theta_p \mid P_{\theta_p} = \max([P_{\theta_2}, \ldots, P_{\theta_L}])\}$ |
| 6 | endif |
| 7 | return $\theta_{align}$ |

Figure 3:
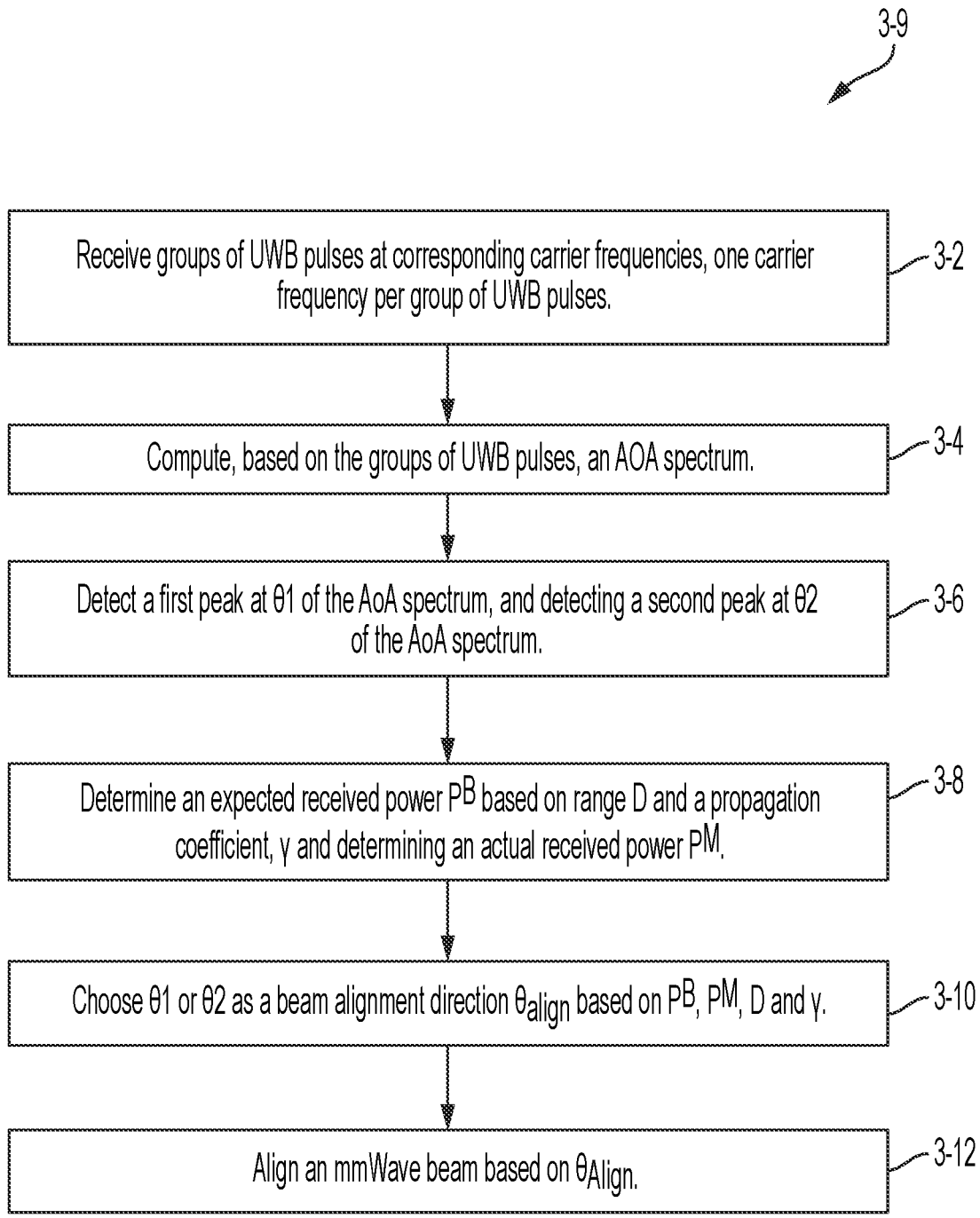
FIG. 3 illustrates logic of selecting an mmWave beam based on received power, according to some embodiments.

The beam alignment selection algorithm is also provided by the logic 3-9 of FIG. 3, according to some embodiments for two peaks.

At operation 3-2, groups of UWB pulses are received at corresponding carrier frequencies, one carrier frequency per group of UWB pulses. At operation 3-4, an AOA spectrum is computed, based on the groups of UWB pulses. Operation 3-6 includes detecting a first peak at 01 of the AoA spectrum, and detecting a second peak at 02 of the AoA spectrum. Operation 3-8 includes determining an expected received power $P^B$ based on range R and a propagation coefficient $\gamma$ and determining an actual received power $P^M$. Operation 3-10 includes choosing $\theta_1$ or $\theta_2$ based on $P^B$, $P^M$, D and $\gamma$.

Figure 4:
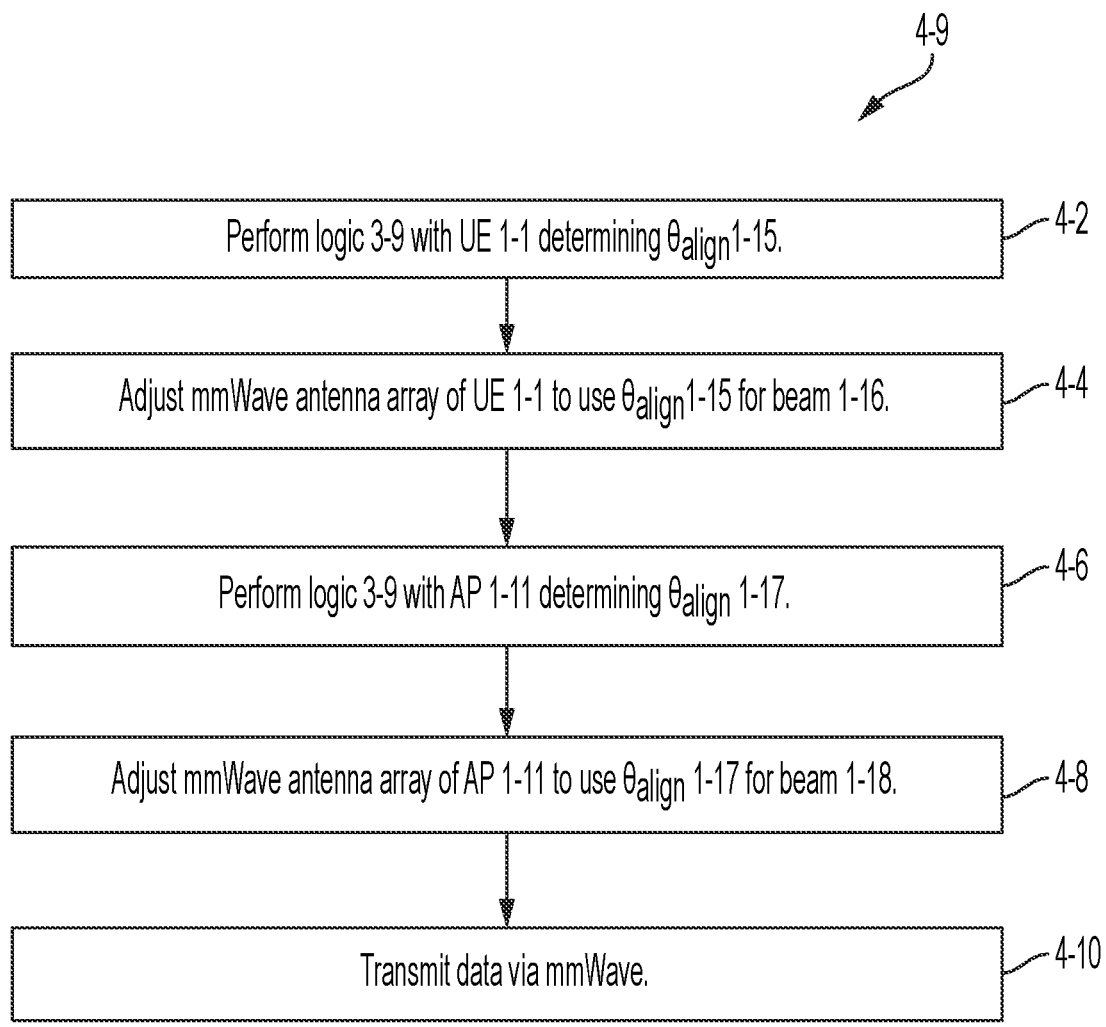
FIG. 4 illustrates logic of aligning an mmWave beam at the UE 1-1 based on received power, according to some embodiments.

FIG. 4 illustrates logic 4-9 for performing the logic 3-9 sequentially by the UE 1-1 and then by the AP 1-11, finally arriving at the solution pair shown in FIG. 1C, ($\theta_{align}$ 1-15, $\theta_{align}$ 1-17).

At operation 4-2, the logic 3-9 is performed with UE 1-1 determining $\theta_{align}$ 1-15. At operation 4-4, UE 1-1 uses $\theta_{align}$ 1-15 determined using UWB to adjust beam 1-6. At operation 4-6, the logic 3-9 is performed with the AP 1-11 determining $\theta_{align}$ 1-17 using UWB. AP 1-11, at operation 4-8, adjusts beam 1-18 using $\theta_{align}$ 1-17. At operation 4-10, mmWave data is transmitted by UE 1-1 and/or AP 1-11 using the aligned beams (beam 1-16 and beam 1-18).

In a radio antenna pattern, the half power beam width is the angle between the half-power (−3 dB) points of the main lobe, when referenced to the peak effective radiated power of the main lobe. Beamwidth is usually expressed in degrees and for the horizontal plane. As an example, a misadjustment in beam alignment may cause an impinging wave (signal such as 1-3) to be received at the half power beam width or at an angle further off the maximum of the beam with even more attenuation. Receiving an attenuated wave reduces the received signal power.

The maximum data rate that can be supported depends on the received signal power, the interference and the noise. The interference and noise do not decrease when the beam is mis-aligned. An upper limit on the achievable data rate is given by the Shannon-Hartley expression in Eq. 12.

$$\text{Data Rate} < B \log_2\left(1 + \frac{P_S}{P_N}\right) \qquad \text{Eq. 12}$$

B is the channel bandwidth, $P_S$ is the received signal power and $P_N$ represents the interference and noise power. For misalignment of a small amount so that the received signal arrives at the shoulder of the beam (half power beam width), $P_S/P_N$ is reduced by ½. At low SNR of $P_S/P_N=1$, the maximum Data Rate is then reduced to $\log_2(1+0.50*1)=0.58$ B from 1.0 B, a 42% reduction in the maximum (Eq. 12). The benefit of accurate beam alignment using multiple frequencies is further illustrated in FIG. 5.

Figure 5:
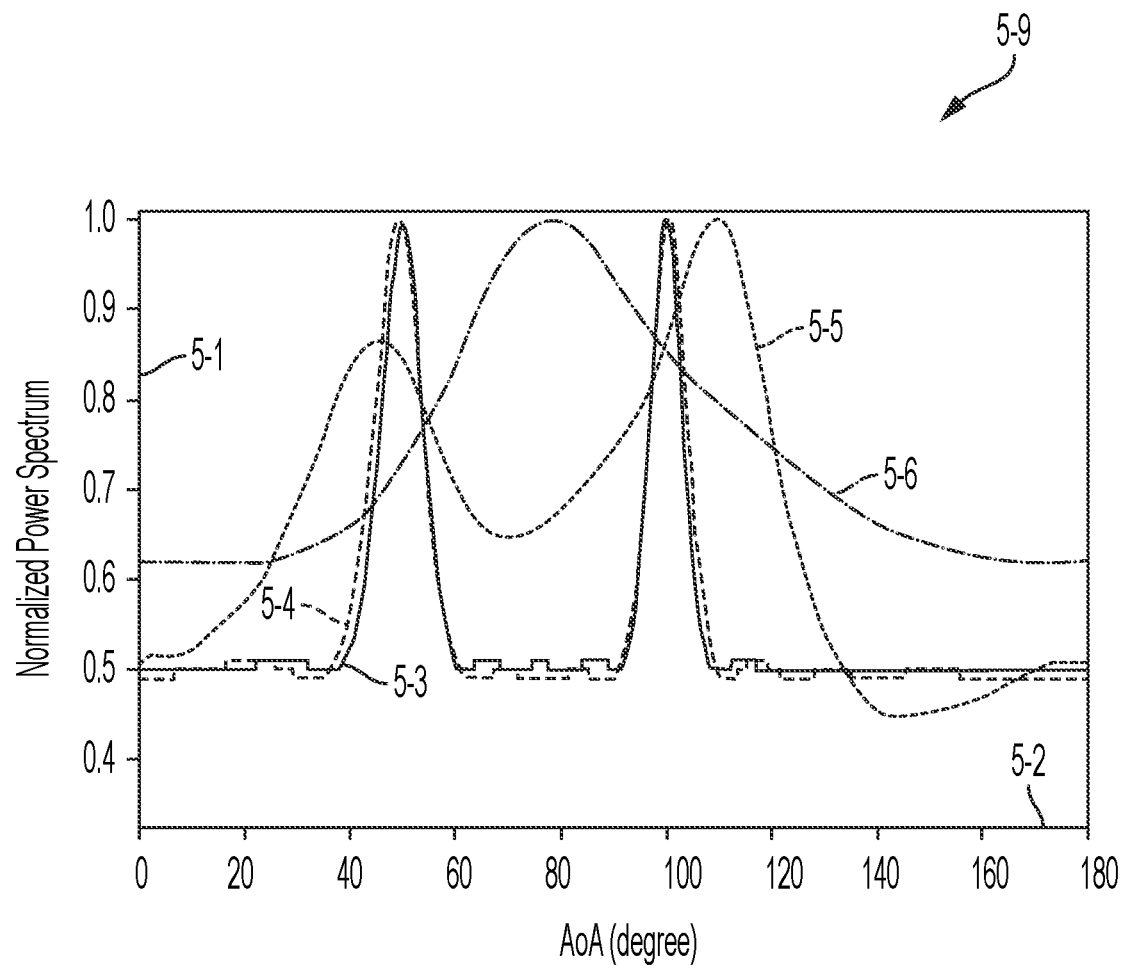
FIG. 5 illustrates a variation in an angle of arrival (AoA) power spectrum depending on number of antennas and number of frequencies, according to some embodiments.

FIG. 5 illustrates AoA spectra for several different configurations. The y-axis (5-1) is the normalized power of the power spectrum, $P(\theta)$. The x-axis (5-2) is the AoA ($\theta$). Two waves are impinging on the antenna array, one at 50 degrees and one at 100 degrees. Table 2 gives the correspondence of the curves in FIG. 5 with the applied solution technique.

TABLE 2

Solution Techniques of FIG. 5

| Curve | Technique | $P_\theta$ Equation |
|---|---|---|
| 5-3 | M = 16 antennas and K = 1 frequency | Eq. 5 |
| 5-4 | M = 3 antennas and K = 9 frequencies | Eq. 10 |
| 5-5 | M = 3 antennas and K = 5 frequencies | Eq. 10 |
| 5-6 | M = 3 antennas and K = 1 frequency | Eq. 5 |

As shown in Table 2, curve 5-3 is the result of the MUSIC algorithm with M=16 antennas and K=1 frequency and curve 5-6 is for M=3 antennas and K=1 frequency.

The computed AoA spectra of some example embodiments is shown by curves 5-4 and 5-3. Curve 5-4 is for M=3 antennas and K=9 frequencies. Curve 5-5 is for M=3 antennas and K=5 frequencies. The reduction in maximum data rate depends on the radio antenna pattern of the antenna array.

The non-linearity of the MUSIC algorithm is reflected in curves 5-5 and 5-6 not being symmetrical with respect to the average of these angles, 75 degrees.

Figure 6A:
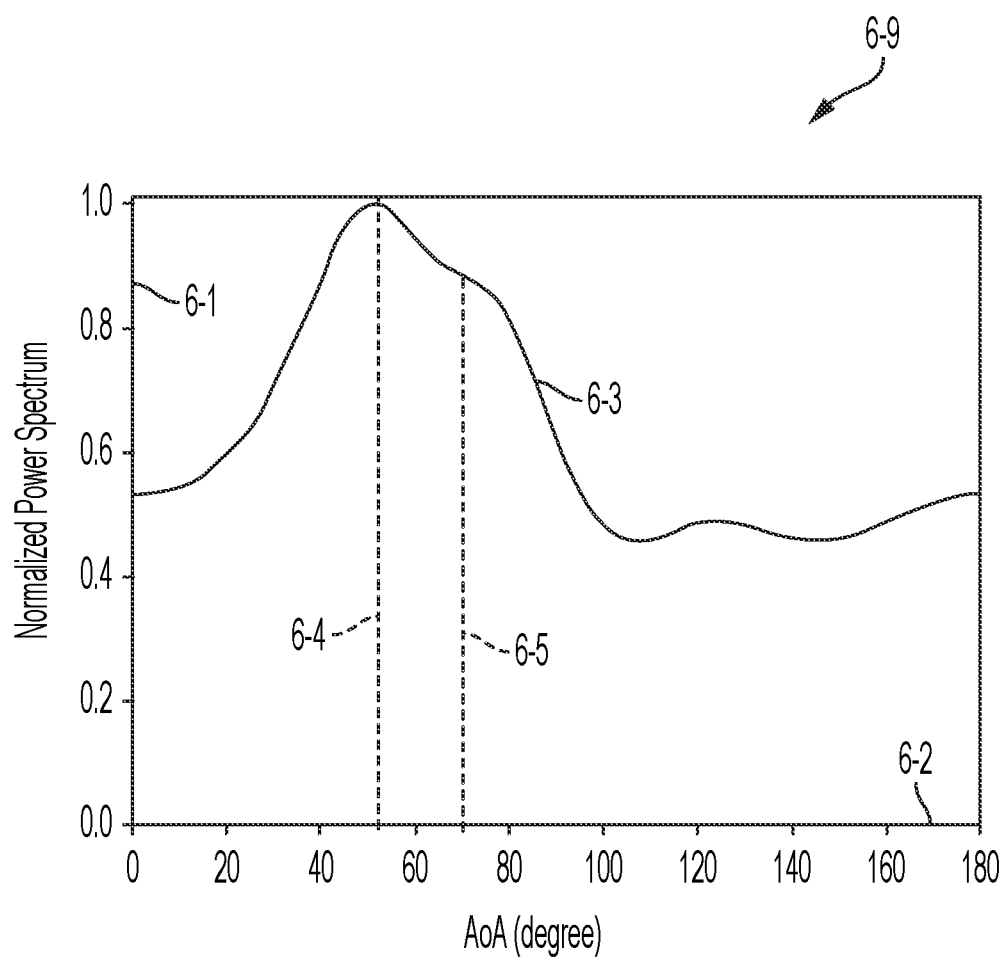
FIG. 6A illustrates a problem of an AoA power spectrum when two angles of arrival are near each other.

When multiple signals arrive at close angles, the AoA spectrum of a weak signal will be submerged in strong signals. Thus, existing methods are hard to estimate angle-of-arrival (AoA) of all signals, and will miss some signal's AoA. FIG. 6A shows the AoA spectrum 6-3 of two signals arrive at 50 degrees (strong, marked as 6-4) and 70 degrees (weak, marked as 6-5). Because there is only one peak in the spectrum provided by the MUSIC algorithm, i.e., the peak located at 50 degrees the second wave at 70 degrees will not be found.

To better identify all paths, embodiments provide an angle refinement method using a convolutional neural network (CNN). A CNN is a class of deep neural network. A CNN includes a shared-weight architecture of convolution kernels or filters that slide along input features and provide responses known as feature maps. A convolutional neural network consists of an input layer, hidden layers and an output layer. In any feed-forward neural network, any middle layers are called hidden because their inputs and outputs are masked by the activation function and final convolution. In a convolutional neural network, the hidden layers include layers that perform convolutions. Typically this includes a layer that performs a dot product of the convolution kernel with the layer's input matrix. This product is usually the Frobenius inner product, and its activation function is commonly ReLU. As the convolution kernel slides along the input matrix for the layer, the convolution operation generates a feature map, which in turn contributes to the input of the next layer. This is followed by other layers such as pooling layers, fully connected layers, and normalization layers. A CNN is familiar to one of ordinary skill in the art.

Figure 6B:
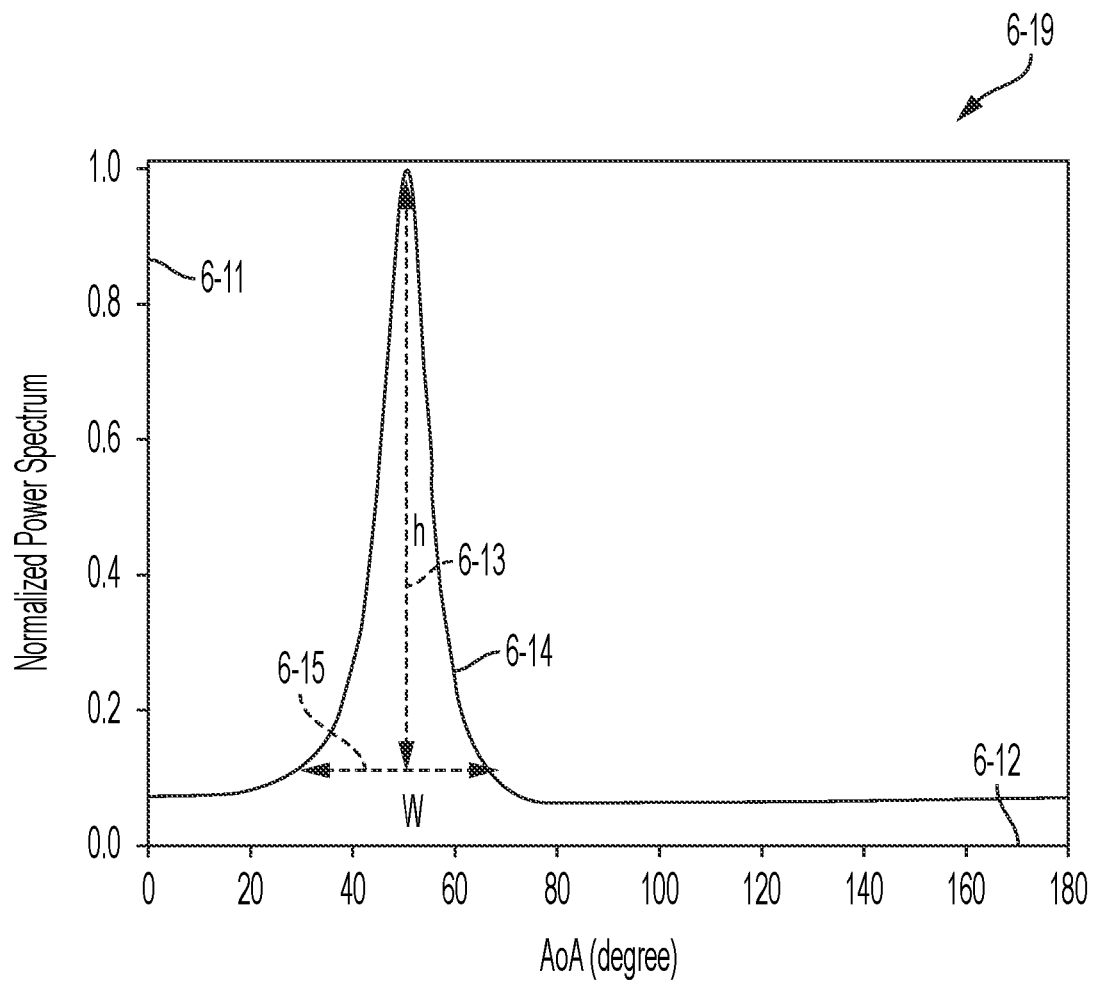
FIG. 6B illustrates an example of a confidence rate for a narrow peak in an AoA power spectrum.

To determine whether the CNN should be applied, embodiments define a confidence rate (CR). CR=h/w, where h is the difference between the (peak spectrum value) and the 1.05*(Min spectrum value); w is the angle width when the line y=1.05*(minimum spectrum value) cut through the spectrum. FIG. 6B illustrates a graph with y-axis 6-11, x-axis 6-12 and spectrum 6-14. FIG. 6B provides an illustration of h (6-13 in FIG. 6B) at 50 degrees and w (6-15 in FIG. B) for the spectrum 6-14.

Figure 6C:
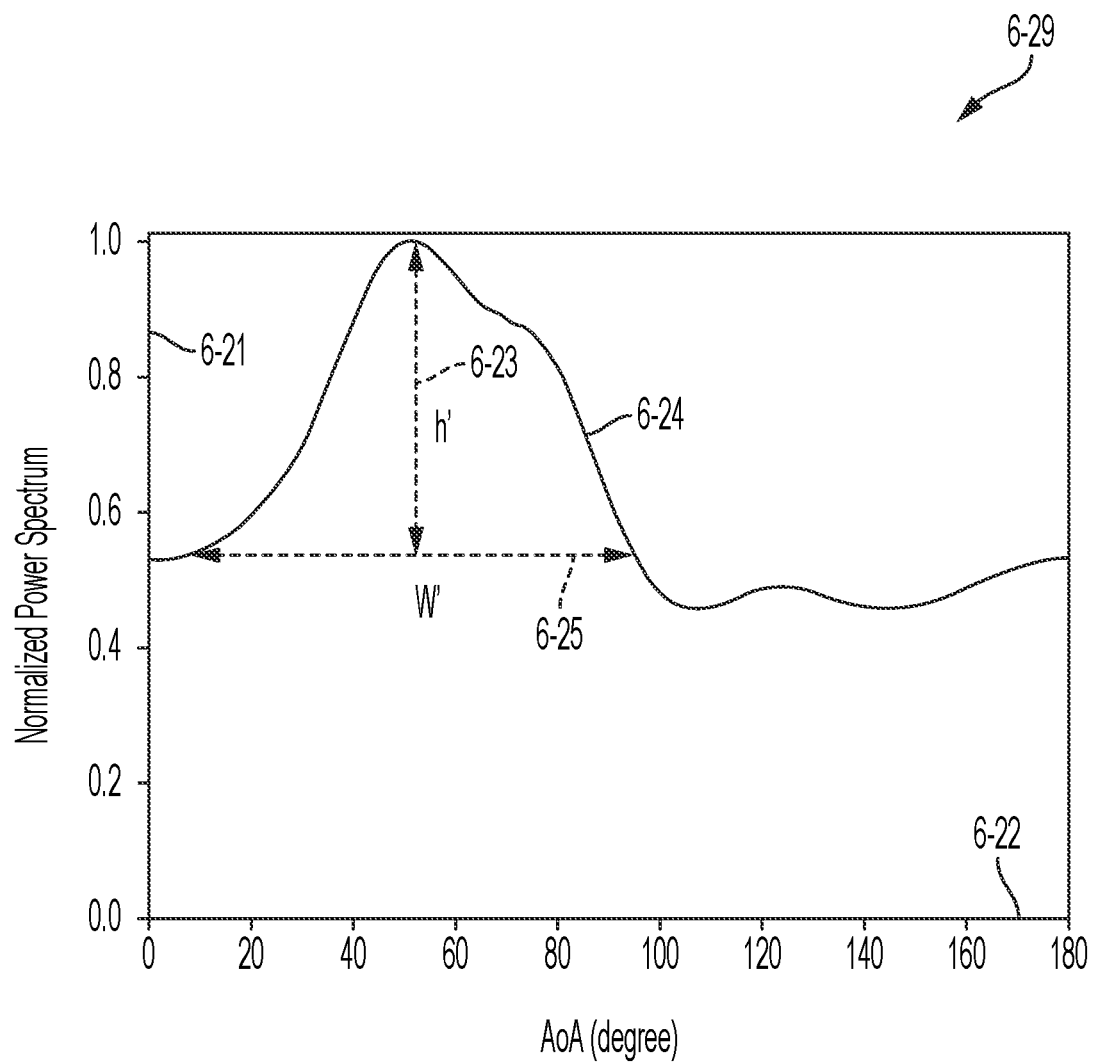
FIG. 6C illustrates an example of a confidence rate (CR) for a broad peak in an AoA power spectrum.

When two signals arrive at close angles, the peak spectrum does not indicate the two AoAs correctly. FIG. 6C illustrates a wide spectrum 6-24 with a high CR value (similar to FIG. 6A). Specifically, FIG. 6C illustrates the AoA spectrum of two signals arrivals at 50 degrees and 70 degrees. The wave at 70 degrees is hard to identify, and we refer to this as an AoA missing issue. To refine the angle estimation, embodiments first detect this AoA missing issue.

The CR can detect the AoA missing issue. For example, in FIG. 6B, CR>>1; in FIG. 6C, CR<1. Thus, by using a threshold, embodiments detect the AoA missing issue.

Figure 7A:
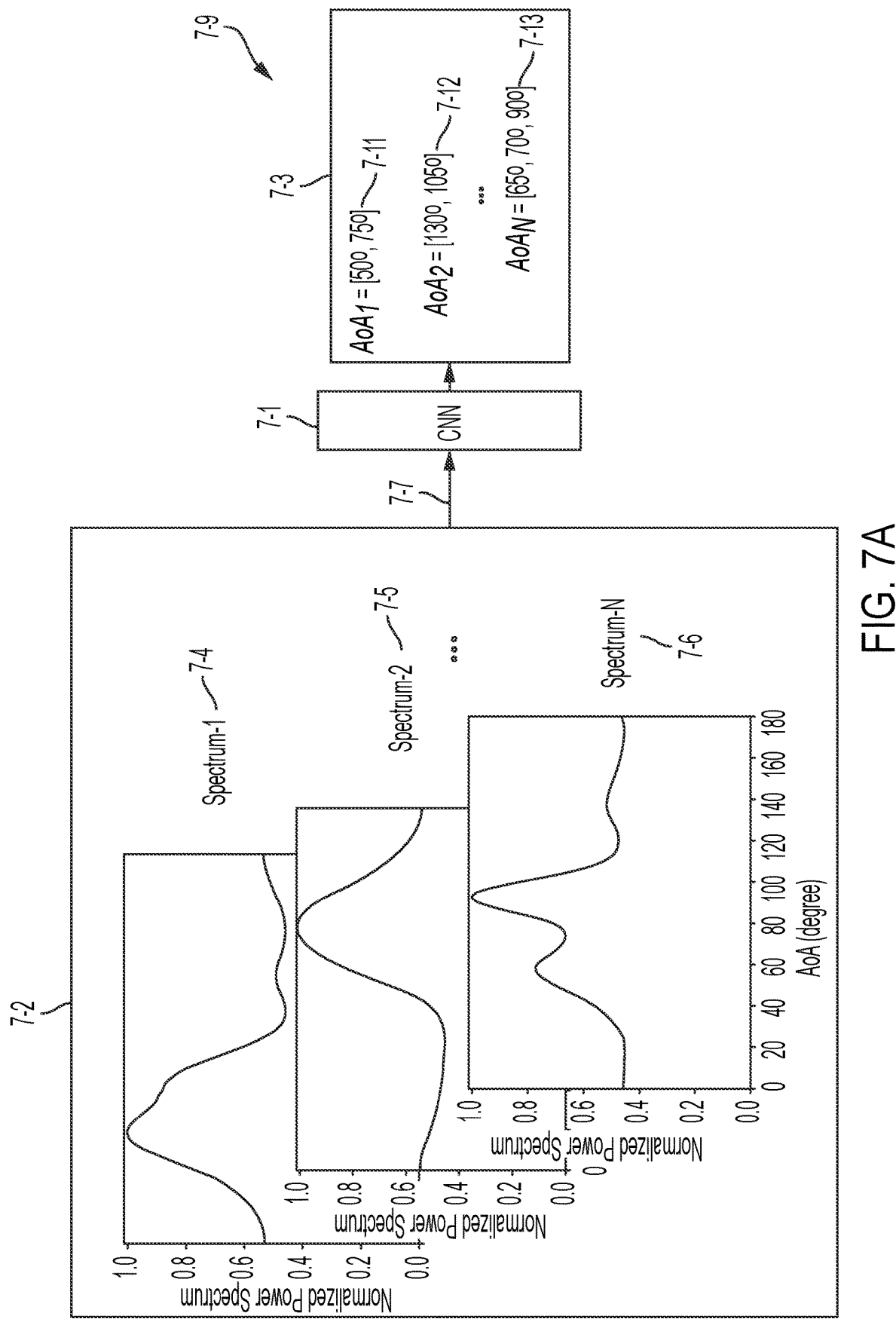
FIG. 7A illustrates logic which includes checking the CR and possibly using a convolutional neural network (CNN), according to some embodiments.

FIG. 7A illustrates a system 7-9 for using a CNN 7-1. The CNN 7-1 has already been trained using a training set and ground truth target values (not shown). The CNN 7-1 has converged based on the training, for example, when reconstruction error between training set or a reserved set of data and ground truth values is below an acceptable threshold such as 1% error power. The CNN 7-1 is then ready for use as shown in FIG. 7A (also see logic 7-29 of FIG. 7B).

In FIG. 7A, as an example, data for classification during inference includes Spectrum-1 identified as 7-4, Spectrum-2 identified as Spectrum 7-5, other spectra indicated by the ellipsis, and Spectrum-N indicated by 7-6.

Each spectrum is formatted as an image 7-7.

The image 7-7 is input to the CNN 7-1. At the output of the CNN 7-1, classifications 7-3 include estimates of a number of waves and AoA values for each wave. FIG. 7A illustrates 7-3 including angles (2 peaks at 50 degrees, 65 degrees) identified as 7-11 and corresponding to 7-4, angles (2 peaks at 103 degrees, 105 degrees) identified as 7-12 and corresponding to 7-5, other classifications indicated by the ellipsis, and angles (3 peaks at 65 degrees, 60 degrees and 90 degrees) identified as 7-13 and corresponding to 7-6.

Figure 7B:
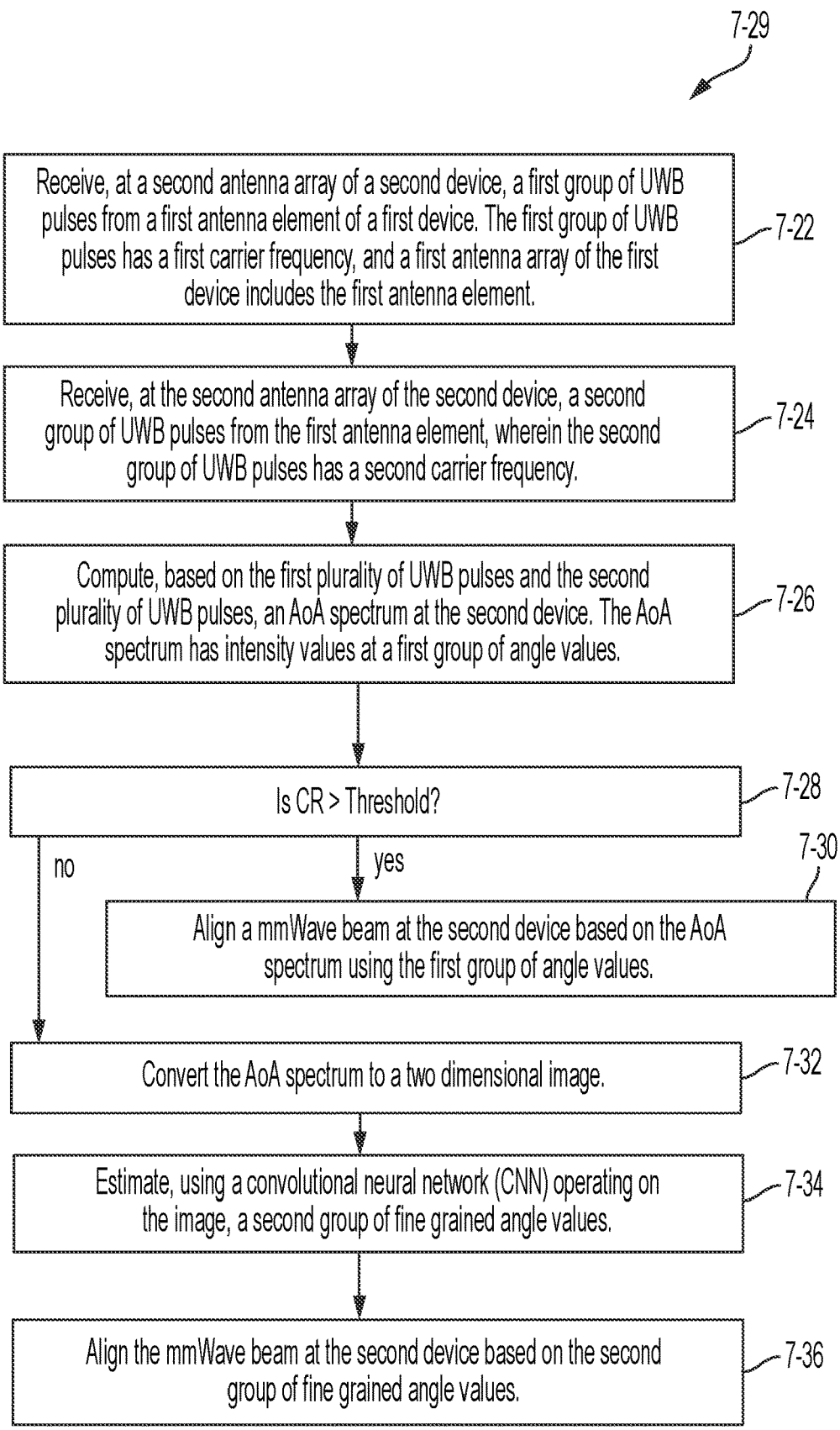
FIG. 7B illustrates training the CNN to recognize underlying AoAs when the confidence rate is low, according to some embodiments.

FIG. 7B illustrates logic 7-29 for using the CNN 7-1.

Operation 7-22 includes receiving, at a second antenna array of a second device, a first group of UWB pulses from a first antenna element of a first device. The first group of UWB pulses has a first carrier frequency, and a first antenna array of the first device includes the first antenna element.

Operation 7-24 includes receiving, at the second antenna array of the second device, a second group of UWB pulses from the first antenna element, wherein the second group of UWB pulses has a second carrier frequency.

Operation 7-26 includes computing, based on the first plurality of UWB pulses and the second plurality of UWB pulses, an AoA spectrum at the second device. The AoA spectrum has intensity values at a first group of angle values.

Operation 7-28 first determines CR (see the discussion of FIGS. 6B and 6C) and then evaluates whether CR is above a threshold. If the CR is above the threshold, the logic flow 7-29 proceeds to operation 7-30. At operation 7-30, an mmWave beam is aligned at the second device based on the AoA spectrum using the first group of angle values.

If the CR is not above the threshold, the logic flow 7-29 proceeds to operations 7-32, 7-34 and 7-36.

Operation 7-32 includes converting the AoA spectrum to a two dimensional image, for example, image 7-7 of FIG. 7A. This can be done for example, by discretizing the x-axis 6-22, the y-axis 6-21 and considering each point on the curve 6-24 of FIG. 6C as defining an pixel intensity of 1, and every other (x,y) pair defined by the discretization as corresponding to a pixel intensity of 0.

Operation 7-34 applies the image to the CNN 7-1 and obtains a number of peaks and the angle value corresponding to each peak (see 7-3 of FIG. 7A).

At operation 7-36, the mmWave beam is aligned at the second device based on the group of fine grained angle values. The selection of $\theta_{align}$ may including using Algorithm 1 (Table 1) (not shown in FIG. 7B).

Figure 8:
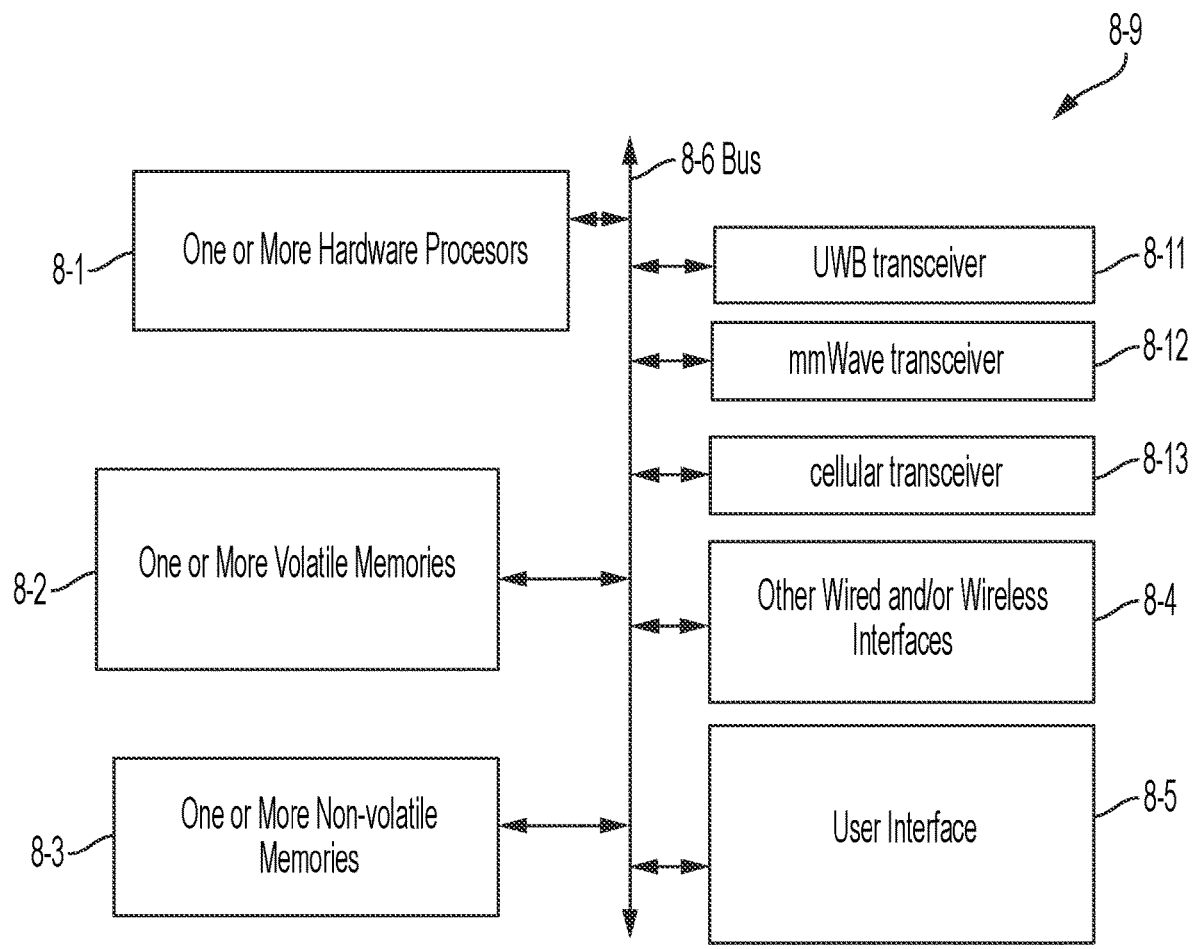
FIG. 8 illustrates exemplary hardware according to some embodiments.

FIG. 8 illustrates an exemplary apparatus 8-9 for implementation of the embodiments disclosed herein. For example, FIG. 8 illustrates exemplary hardware for implementation of computing devices such as UE 1-1 and AP 1-11, according to some embodiments. The apparatus 8-9 may be a server, a computer, a laptop computer, a handheld device, or a tablet computer device, for example. Apparatus 8-9 may include one or more hardware processors 8-1. The one or more hardware processors 8-1 may include an ASIC (application specific integrated circuit), CPU (for example CISC or RISC device), and/or custom hardware. Apparatus 8-9 also may include a UWB transceiver 8-11, an mmWave transceiver 8-12, a cellular transceiver 8-13 and other wired and/or wireless interfaces 8-4. Apparatus 8-9 also may include a user interface 8-5 (for example a display screen and/or keyboard and/or pointing device such as a mouse). Apparatus 8-9 may include one or more volatile memories 8-2 and one or more non-volatile memories 8-3. The one or more non-volatile memories 8-3 may include a non-transitory computer readable medium storing instructions for execution by the one or more hardware processors 8-1 to cause apparatus 8-9 to perform any of the methods of embodiments disclosed herein.

What is claimed is:

1. A method of aligning millimeter wave (mmWave) beam transmissions, the method comprising:
receiving, at a second antenna array of a second device, a first plurality of ultra wideband (UWB) pulses from a first antenna element of a first device, wherein the first plurality of UWB pulses has a first carrier frequency, and a first antenna array of the first device includes the first antenna element;
receiving, at the second antenna array of the second device, a second plurality of UWB pulses from the first antenna element, wherein the second plurality of UWB pulses has a second carrier frequency;
computing, based on the first plurality of UWB pulses and the second plurality of UWB pulses, an angle of arrival (AoA) spectrum at the second device; and
aligning a mmWave beam at the second device based on the AoA spectrum.

2. The method of claim 1, wherein the computing the AoA spectrum comprises:
forming a received vector indexed by received carrier frequency and indexed by antenna element of the second antenna array; and
the computing comprises computing the AoA spectrum based on a correlation of the received vector.

3. The method of claim 2, further comprising:
forming an outer product of the received vector; and
obtaining the correlation as an expectation of the outer product.

4. The method of claim 3, further comprising:
determining a noise subspace of the correlation;
forming a quadratic form based on the noise subspace and a steering vector dependent on an angle variable; and
the computing further comprises evaluating an inverse of the quadratic form for a plurality of values of the angle variable.

5. The method of claim 4, wherein the method further comprises:
determining an expected received power based on a range and a propagation coefficient;
determining a first value of the angle variable as associated with a direct path based on a time of flight;
determining an actual received power;
when a difference between the expected received power and the actual received power is less than a threshold, choosing an alignment angle value to be the first value of the angle variable; and
when the difference is not less than the threshold, choosing a second value of the angle variable associated with a maximum peak in the AoA spectrum as the alignment angle value.

6. The method of claim 5, wherein the choosing only chooses from a second plurality of values of the angle variable, wherein the plurality of values includes the second plurality of values, the second plurality of values is associated with a largest Q spectrum values, and Q is about three or four.

7. The method of claim 1, wherein the method further comprises:
receiving, at the first antenna array of the first device, a third plurality of UWB pulses from a second first antenna element of the second device, wherein the third plurality of UWB pulses has a third carrier frequency, and the second antenna array of the second device includes the second first antenna element of the second device;
receiving, at the first antenna array of the first device, a fourth plurality of UWB pulses from the second first antenna element of the second device, wherein the fourth plurality of UWB pulses has a fourth carrier frequency;
computing, based on the third plurality of UWB pulses and the fourth plurality of UWB pulses, a second AoA spectrum at the first device; and
aligning the mmWave beam at the first device based on the second AoA spectrum.

8. The method of claim 1, further comprising:
repeating the receiving, at the second antenna array of the second device, an additional plurality of UWB pulses from the first antenna element, wherein the additional plurality of UWB pulses has a carrier frequency distinct from those carrier frequencies previously received,
wherein the repeating causes a total number of distinct carrier frequencies to be received from a total of K carrier frequencies, K is less than or equal to 11; and
the computing further comprises determining the AoA spectrum based on the K carrier frequencies.

9. The method of claim 1, wherein the AoA spectrum has a plurality of intensity values at a corresponding first plurality of angle values, the method further comprising:
calculating a confidence value based on the AoA spectrum;
only when the confidence value is higher than a threshold:
aligning the mmWave beam at the second device based on the AoA spectrum; and when the confidence value is not higher than the threshold:

converting the AoA spectrum to a two dimensional image;

estimating, using a convolutional neural network applied to the two dimensional image, a second plurality of fine grained angle values; and aligning the mmWave beam at the second device based on the second plurality of fine grained angle values.

10. A device comprising:

an antenna array;

one or more memories; and one or more processors, wherein the one or more processors are configured to access a computer program stored as plurality of instructions stored in the one or more memories, wherein the computer program is configured to cause the one or more processors to:

receive, at the antenna array, a first plurality of ultra wideband (UWB) pulses from a first antenna element of another device, wherein the first plurality of UWB pulses has a first carrier frequency, and another antenna array of the another device includes the first antenna element of the another device;

receive, at the antenna array, a second plurality of UWB pulses from the first antenna element of the another device, wherein the second plurality of UWB pulses has a second carrier frequency;

compute, based on the first plurality of UWB pulses and the second plurality of UWB pulses, an angle of arrival (AoA) spectrum at the device; and align a millimeter wave (mmWave) beam at the device based on the AoA spectrum.

11. The device of claim 10, wherein the computer program is further configured to cause the one or more processors to:

form a received vector indexed by received carrier frequency and indexed by antenna element of the antenna array; and compute the AoA spectrum based on a correlation of the received vector.

12. The device of claim 11, wherein the computer program is further configured to cause the one or more processors to:

form an outer product of the received vector; and obtain the correlation as an expectation of the outer product.

13. The device of claim 12, wherein the computer program is further configured to cause the one or more processors to:

determine a noise subspace of the correlation;

form a quadratic form based on the noise subspace and a steering vector dependent on an angle variable; and evaluate an inverse of the quadratic form for a plurality of values of the angle variable.

14. The device of claim 13, wherein the computer program is further configured to cause the one or more processors to:

determine an expected received power based on a range and a propagation coefficient;

determine a first value of the angle variable as associated with a direct path based on a time of flight;

determine an actual received power;

when a difference between the expected received power and the actual received power is less than a threshold, choose an alignment angle value to be the first value of the angle variable; and when the difference is not less than the threshold, choose a second value of the angle variable associated with a maximum peak in the AoA spectrum as the alignment angle value.

15. The device of claim 14, wherein the computer program is further configured to cause the one or more processors to:

only choose from a second plurality of values of the angle variable, wherein the plurality of values includes the second plurality of values, the second plurality of values is associated with a largest Q spectrum values, and Q is about three or four.

16. A non-transitory computer readable medium storing a computer program, wherein the computer program is configured to cause a device to:

receive, at an antenna array, a first plurality of ultra wideband (UWB) pulses from a first antenna element of another device, wherein the first plurality of UWB pulses has a first carrier frequency, and another antenna array of the another device includes the first antenna element of the another device;

receive, at the antenna array, a second plurality of UWB pulses from the first antenna element of the another device, wherein the second plurality of UWB pulses has a second carrier frequency;

compute, based on the first plurality of UWB pulses and the second plurality of UWB pulses, an angle of arrival (AoA) spectrum at the device; and align a millimeter wave (mmWave) beam at the device based on the AoA spectrum.

17. The non-transitory computer readable medium of claim 16, wherein the computer program is further configured to cause the device to:

form a received vector indexed by received carrier frequency and indexed by antenna element of the antenna array; and compute the AoA spectrum based on a correlation of the received vector.

18. The non-transitory computer readable medium of claim 17, wherein the computer program is further configured to cause the device to:

form an outer product of the received vector; and obtain the correlation as an expectation of the outer product.

19. The non-transitory computer readable medium of claim 18, wherein the computer program is further configured to cause the device to:

determine a noise subspace of the correlation;

form a quadratic form based on the noise subspace and a steering vector dependent on an angle variable; and evaluate an inverse of the quadratic form for a plurality of values of the angle variable.

20. The non-transitory computer readable medium of claim 19, wherein the computer program is further configured to cause the device to:

determine an expected received power based on a range and a propagation coefficient;

determine an actual received power;

choose, based on the expected received power and the actual received power, an alignment angle value from the plurality of values of the angle variable.

* * * * *